United States Patent [19]

Wong

[11] 4,395,077

[45] Jul. 26, 1983

[54] SPINDLE ASSEMBLY

[75] Inventor: Simon F. Wong, Sunnyvale, Calif.

[73] Assignee: Sperry Corporation, New York, N.Y.

[21] Appl. No.: 286,903

[22] Filed: Jul. 27, 1981

[51] Int. Cl.³ ............................................. F16C 19/06
[52] U.S. Cl. ............................. 308/189 A; 308/187.1; 308/191
[58] Field of Search ...................... 308/191, 187.1, 190, 308/189 A, 189 R, 208, 207 R, 192

[56] References Cited

U.S. PATENT DOCUMENTS

| | | | |
|---|---|---|---|
| 1,452,603 | 4/1923 | Himes | 308/189 A |
| 4,054,335 | 10/1977 | Timmer | 308/191 |
| 4,141,606 | 2/1979 | Yamamura | 308/189 R |

Primary Examiner—Lenard A. Footland
Attorney, Agent, or Firm—Eugene T. Battjer; Marshall M. Truex; Thomas H. Olson

[57] ABSTRACT

A spindle assembly comprising a hub rotatably supported about a fixed shaft by a pair of ball bearings disposed along the shaft and having a preload spring compressed between a member on the shaft and the inner race of one of the bearings to establish back to back mounting of the bearings for holding the shaft axis in collinear alignment with the centerline of the hub which includes inner and outer laterally connected cylinders with the shaft extending through the inner cylinder and the outer cylinder being adapted for mounting thereabout of members to be rotated.

6 Claims, 2 Drawing Figures

SPINDLE ASSEMBLY

BACKGROUND OF THE INVENTION

1. Field of Invention

This invention relates to spindle assemblies and more particularly to a new and improved spindle assembly especially suited for reducing non repetitive runout (wobble) in a magnetic disc storage system.

2. Description of the Prior Art

A spindle assembly of a magnetic disc storage system has typically comprised a vertically oriented shaft rotatably supported by a pair of ball bearings disposed along the shaft within the bore of a support housing. A somewhat bell shaped hub adapted to support magnetic discs is affixed to the shaft for rotation therewith after the shaft is supported with in the housing. The hub is attached to the shaft near the end above the upper ball bearing such that the sides of the hub extend downward outside the shaft housing to accommodate the magnetic discs in a vertically stacked array slightly spaced relative to one another and concentrically disposed about the hub and shaft. Mechanical tolerances of the ball bearings, the housing bore and the shaft diameter and circumference result in a nonrepetitive runout or wobble condition which causes any point on a magnetic disc to move in slightly varying circles on successive rotations. The condition is aggravated in magnetic discs located near the lower extremity of the hub due to the fact that such portion of the hub is less rigid and more likely to introduce additional wobble.

A more recently contrived spindle assembly which has been used in the magnetic disc storage art comprises a horizontally oriented shaft rotatably supported by a pair of ball bearings disposed along the shaft within the bore of a support housing. The hub that supports the discs is essentially a collar which is attached to the shaft in the region intermediate the ball bearings. Such construction will considerably reduce nonrepetitive runout compared to the aforedescribed devices, in which the hub is supported on the shaft at one end outside the region between the bearings, provided that the centerline of the housing bore is aligned collinearly with the longitudinal axis of the shaft. This alignment is difficult to achieve, however, because the housing is made in two pieces each of which has an end of the shaft inserted thereinto after the hub and discs have been mounted on the shaft.

The foregoing limitations of presently available magnetic disc storage spindle assemblies are overcome to a great extent by means of apparatus constructed in accordance with the principles of the present invention as will become apparent from the ensuing description.

SUMMARY OF THE INVENTION

A magnetic disc storage spindle assembly embodying the principles of the present invention includes a shaft which is rigidly attached at each end to a stationary housing or base plate. A hub consisting essentially of inner and outer concentric laterally connected cylinders is rotatably supported on the shaft by a pair of ball bearings disposed along the shaft intermediate the circumference of the shaft and the interior wall of the inner cylinder (bore of the hub). A preload is applied to the bearings, preferably in a back to back mounting, by means of a spring to hold the hub bore centerline rigidly in collinear alignment with the longitudinal axis of the shaft. Such configuration of the spindle assembly affords significant reduction of nonrepetitive runout since the discs and hub are concentrically disposed about the shaft generally in the region intermediate the bearings supporting the hub on the shaft and further because the need for a two piece housing is obviated thus eliminating the alignment problems attendant to such construction. Further details and advantages of the invention will be appreciated from a reading of the following detailed description given with reference to the appended drawings.

DESCRIPTION OF THE PREFERRED EMBODIMENT

Figure 2:
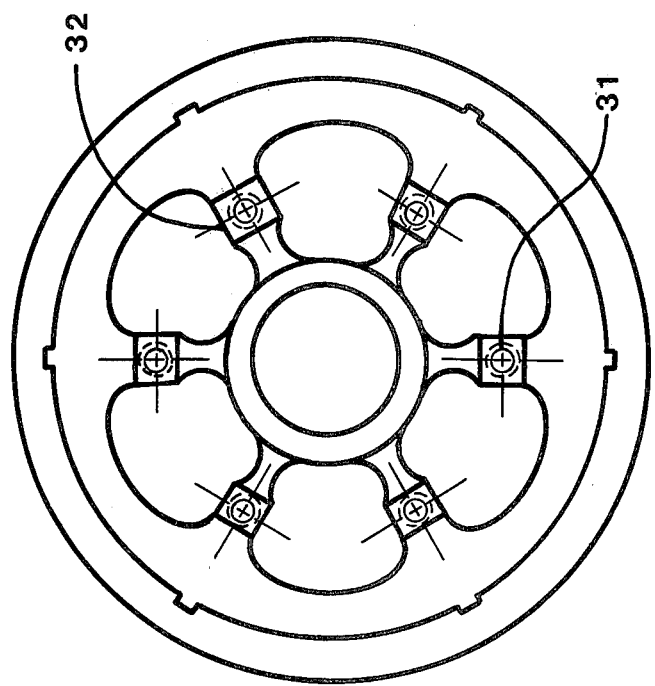
FIG. 2 is a right side end view of the hub incorporated in the spindle assembly illustrated in FIG. 1.
Figure 1:
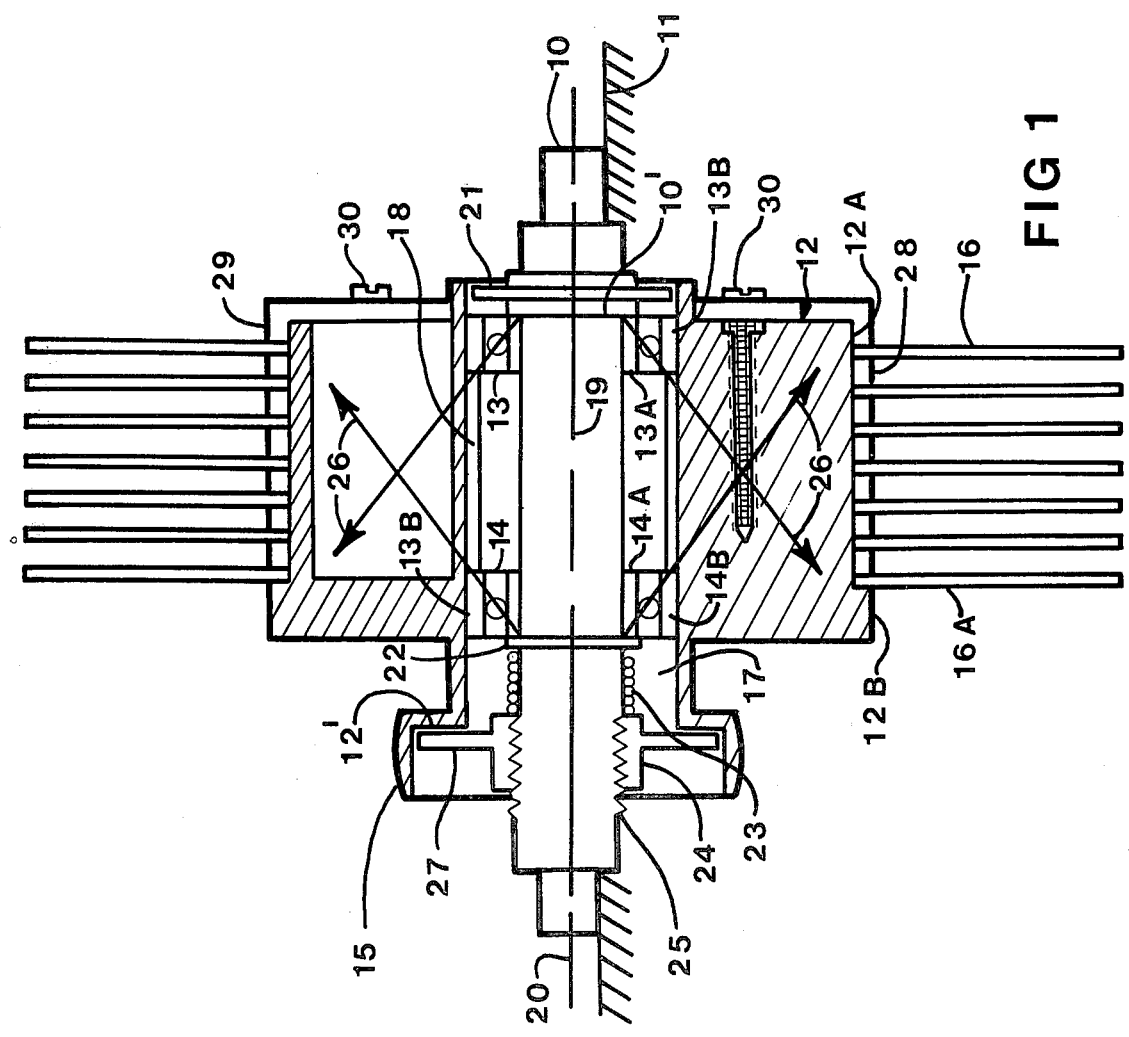
FIG. 1 is a side cross sectional view of a spindle assembly embodying the principles of the invention.

Referring to the figures, the illustrated spindle assembly comprises a shaft 10 rigidly secured at each end to a base plate 11 and a hub 12 concentrically disposed about and supported on the shaft by ball bearings 13 and 14 having respective inner races 13A, 14A and outer races 13B, 14B. Hub 12 includes as an integral part thereof a pulley 15 adapted for connection to a motor drive to rotate the hub about shaft 10. Magnetic discs 16 are mounted on the hub for rotation therewith.

The spindle assembly is constructed as follows. Ball bearing 13 is pressed into the bore 17 of hub 12 and secured therein by bonding outer race 13B to the bore wall of the hub. Cylindrical spacer 18 is inserted into the hub bore and bonded thereto to fit against outer race 13B. Then ball bearing 14 is pressed into the hub bore such that outer race 14B fits against the opposite end of spacer 18 and is bonded to the bore wall. Next, shaft 10, which is preferably made of steel, is inserted through the hub bore from the right end until shoulder 10' on the shaft fits against the side of inner race 13A with the shaft circumference in loose contacting relation with the interior circular surfaces of inner races 13A and 14A of ball bearings 13 and 14 such that the longitudinal axis 19 of shaft 10 is collinearly aligned with the centerline 20 of the hub bore. A circular bearing loading spacer (washer) 22, preferably made of steel, is positioned over the other end of shaft 10 in abutting relation with the inner race 14A of ball bearing 14. Preloading spring 23 is then positioned over shaft 10 in contacting relation with bearing loading spacer 22, after which nut 24 is wound onto threads 25 of shaft 10 to compress the preloading spring appropriately so as to exert forces as indicated by lines 26 to hold the hub bore centerline in collinear alignment with the longitudinal axis of the shaft during rotational motion of the hub relative to the shaft. The spring constant and compression of preloading spring 23 are selected to provide the required preloading bearing force. Nut 24 is designed so that wing 27 is in close non-contacting relation with the inner wall 12' of the hub and pulley. Circular bearing seal 21, preferably made of aluminum, is positioned over the right end of shaft 10 and bonded to the shoulder 10' of shaft 10 so that the outer circumference of the bearing seal is in close non-contacting relation with the wall of hub bore 17 thereby effectively enclosing the right end of the hub bore.

After construction of the shaft and hub assembly is completed as described above, magnetic disc 16A is positioned over the outer cylindrical wall 12A of hub 12 to rest against shoulder 12B. Then a disc spacer ring 28 is positioned over the hub outer wall against magnetic disc 16A and successive discs and spacers positioned in similar manner until all discs are in position. Finally a disc clamp 29 is positioned over the outer hub wall against the last positioned disc and held there by screws 30 threaded into screw holes 31 in ribs 32 equiangularly disposed about hub 12 and connecting the inner and outer walls thereof. Ribs 31 act to make the hub more rigid so that any nonrepetitive runout which may still exist in operation of the spindle assembly is essentially the same for all magnetic discs. Having been so constructed the spindle assembly is ready for mounting to the base plate 11 and connection of the pulley to a motor drive.

While a preferred embodiment of the invention has been described in specific detail, it will be understood that various modifications and substitutions may be made therein without departing from the spirit and scope of the invention as defined in the appended claims.

What is claimed is:

1. A spindle assembly comprising: a hub having an inner cylinder having an interior wall forming a hub bore, an outer cylinder having an exterior wall around which a member to be rotated is positioned, and a plurality of ribs angularly disposed about said inner cylinder and each extending lengthwise of the hub for connecting the exterior wall of the inner cylinder to the interior wall of the outer cylinder, a shaft extending through said bore and adapted at each end for fixed mounting to a stationary support, said shaft defining an annular shoulder near one end thereof, bearing means disposed within the hub bore intermediate the hub and the shaft for rotatively supporting the hub concentrically about the shaft such that the center line of the hub bore is substantially collinear with the longitudinal axis of the shaft, said bearing means comprising first and second ball bearings disposed along the hub bore in spaced relation to one another, said ball bearings each having an outer race bonded to the hub bore, said first bearing having a side distal the second bearing, said side contacting said shoulder, preloading means engaging said bearing means for supplying a force therethrough to hold the shaft longitudinal axis in substantially collinear alignment with said hub bore center line during rotation of the hub about the shaft, said preloading means including a spring circumscribing said shaft proximate the side of said second bearing distal the first bearing, said shaft having a threaded portion and a nut engaged with said threaded portion for compressing said spring so as to establish forces between said shaft and said hub via said ball bearings, and a pulley part connected with the outer cylinder of said hub for receiving applied force to rotate the hub with respect to the shaft.

2. The apparatus of claim 1 wherein the side of the first bearing contacting the shoulder of the shaft is on the inner race of said first bearing, and the spring produces a force against the side of the second bearing inner race distal the first bearing whereby the first and second bearings are back-to-back mounted so that the forces acting therethrough are directed transversely thereof from the shaft to the hub.

3. The apparatus of claim 2 wherein the hub comprises an inner cylinder having an interior wall which forms the hub bore, an outer cylinder having an exterior wall around which the member to be rotated is positioned, and a pulley part connected with the hub for receiving applied force to rotate the hub with respect to the shaft.

4. The apparatus of claim 3 including a bearing loading washer disposed intermediate the inner race of the second ball bearing and the proximate end of the spring.

5. The apparatus of claim 4 wherein the nut includes a wing of such diameter and so spaced as effectively to seal the end of the hub bore at which the spring is located, and further including a bearing seal having a diameter slightly less than the diameter of the hub bore positioned around the shaft adjacent the exterior surface of the shaft shoulder essentially sealing the end of the hub bore proximate the shaft shoulder.

6. The apparatus of claim 5 including a cylindrical bearing spacer positioned intermediate the first and second bearings in tight contacting relation with the interior wall of the hub bore with one end of the bearing spacer in contact with the outer race of the first bearing and the other end of the bearing spacer in contact with the outer race of the second bearing.

* * * * *